Nov. 28, 1933.                A. H. BATES                1,936,615
                                HEATER
                          Filed May 30, 1930
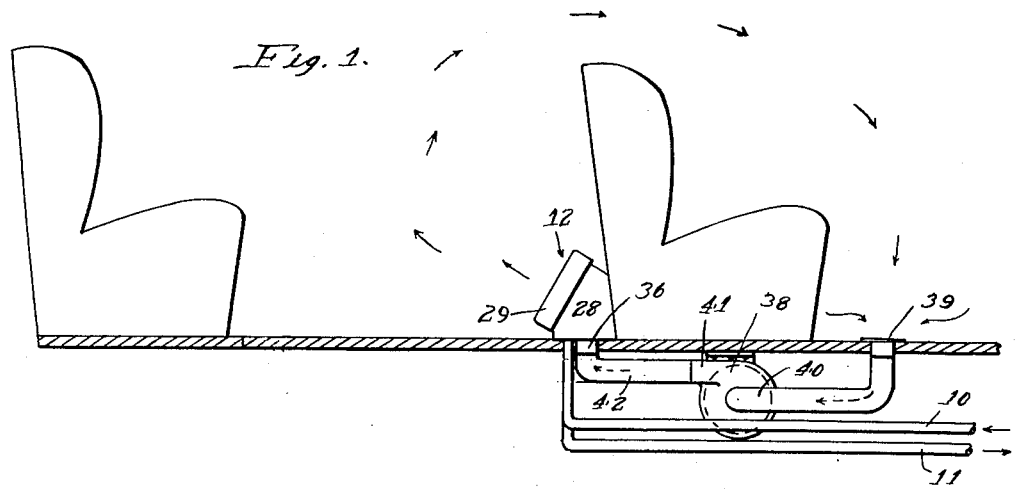
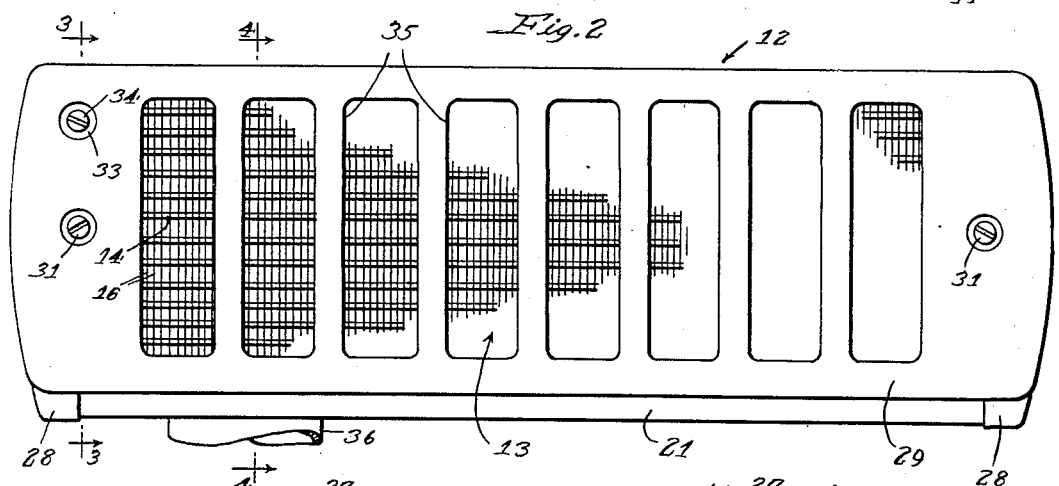
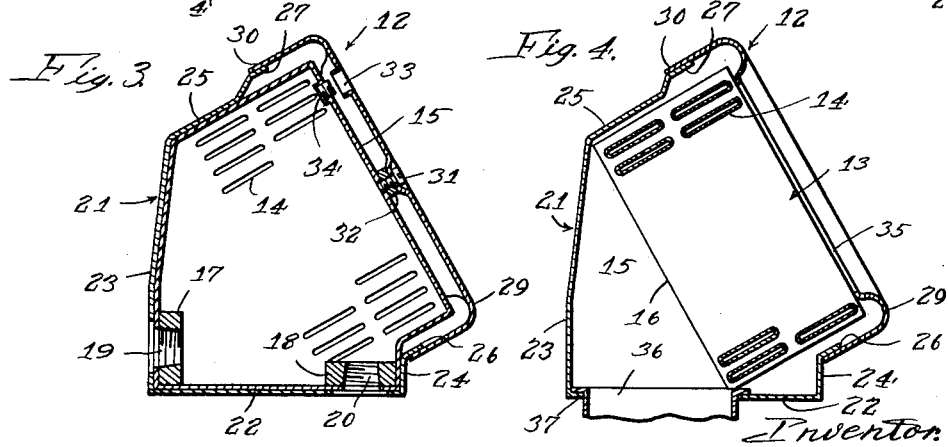
Inventor
By Albert H. Bates
Wilson, Dowell, McCanna & Rehm
Attys.

Patented Nov. 28, 1933

1,936,615

UNITED STATES PATENT OFFICE 1,936,615

HEATER

Albert H. Bates, Rockford, Ill., assignor to Burd High Compression Ring Company, Rockford, Ill., a corporation of Illinois Application May 30, 1930. Serial No. 457,554

1 Claim. (Cl. 98—2)

This invention relates to heaters for motor vehicles and has more particular reference to one utilizing the fluid of the engine cooling system as the heating medium.

The principal object of my invention is to provide a heater of the type mentioned especially designed and adapted for rear seat installation, and having provision for a forced draft therethrough made in such a way as not to interfere with the compactness of the heater and so as to permit installation of the heater behind the front seat or in front of the rear seat, as desired. Heaters having provision for forced draft have been almost entirely limited to use as front seat heaters, that is, to be installed under the cowl, owing to the inability to make a heater of this description compact enough to be suitable for rear seat installation.

In accordance with my invention, the heater is made up simply of a radiator disposed in a casing of generally triangular form in vertical cross-section so as to fit neatly behind the front seat or in front of the rear seat, and a centrifugal blower fan is provided beneath the floor, having the discharge side thereof communicating with the heater casing, and having the intake side thereof communicating with a cold air register provided on the floor, preferably, but not necessarily, in front of the front seat. Thus, the heater is reduced in size practically to the dimensions of the radiator itself, the fan required in connection with it being provided in a separate unit out of the way under the floor. It would obviously be impossible to arrive at greater compactness. But aside from the question of compactness, the arrangement of the heater in the rear passenger compartment and the cold air register in the front passenger compartment promotes good circulation of air and better heat distribution. Furthermore, making the casing approximately triangular shaped in vertical cross-section with the radiator disposed therein in the open front thereof, inclined from a vertical, is of advantage not only from the standpoint of easier installation, but because it permits the front of the heater to be used as a foot rest, the front having a suitable grating for that purpose, as well as arranging for the discharge of heated air upwardly for better circulation and more uniform heat distribution.

The invention is illustrated in the accompanying drawing, wherein—

Figure 1 is a diagrammatic view showing a heater and its fan installed in an automobile in accordance with my invention;

Fig. 2 is a front view of the heater, and

Figs. 3 and 4 are vertical cross-sections taken on the lines 3—3 and 4—4 of Fig. 2.

The same reference numerals are applied to corresponding parts throughout the views.

The heater herein disclosed, as stated above, is especially adapted for installation in the tonneau of an automobile or other motor vehicle on the floor directly behind the front seat or in front of the rear seat, but of course, the heater is not limited to such use, inasmuch as it may be found suitable for various other purposes. For example, heaters of this kind would be suitable for use in motor busses where one could be installed behind or in front of each seat, all being connected in parallel so as to be supplied with the circulating heating medium from the same source. Pipes 10 and 11 leading to and from the heater 12, are extended forwardly, in certain installations to a point under the seat behind which the heater is installed before being extended down through the floor, so as to avoid cross members of the frame. In other installations, however, these pipes may be led directly down through the floor, as shown in Figure 1. The supply pipe 10 has connection preferably through a stop cock with a pipe tapped into the water jacket of the motor at a point where the water attains the highest temperature and where it also gets hot immediately upon starting of the motor, namely, in the head, and the return pipe 11 has connection with a hose tapped into the lower outlet hose connection of the radiator of the car between the latter and its water pump. From this much description it will be evident that hot water or whatever engine cooling fluid is used, and which constitutes the heating medium for the heater, is supplied through the pipe 10 to the radiator 13 of the heater 12 for passage therethrough and return through the pipe 11 to the engine cooling system. In warm weather the heater may be entirely shut off by simply closing the cock in the supply line. In an ordinary four or five passenger car, the heater 12 is usually installed behind the front seat, as shown in Fig. 1, but in the case of seven passenger cars, where folding seats are provided behind the front seat, making it unhandy or even impossible to install the heater behind the front seat, the same is arranged to be installed directly in front of the rear seat. A heater of this sort installed behind the front seat or in front of the rear seat, as the case may be, may constitute the sole heating means for the car, or the same may be provided in conjunction with a front seat heater also having heating fluid circulated through a radiator therein, in which latter event, the supply and return pipes 10 and 11 may be branched off from the same connections with the corresponding pipes for the other heater.

The radiator 13 may, of course, be of any suitable or preferred type. The one herein illustrated has what is known as a turbo-tube core consisting of two or more banks of horizontally extending parallel flat tubes 14 connected at their opposite ends with headers 15, and having transverse radiating fins 16 provided in connection with the tubes to furnish the desired amount of radiation surface. The headers 15 are substantially triangular shaped in vertical cross-section, as shown in Fig. 3, and have the tubes of the core disposed in a plane inclined at an acute angle from the vertical, as clearly appears in Figs. 3 and 4, and forming, as it were, one side of the triangle, and the front of the heater. Blocks 17 and 18 are welded, soldered, or otherwise suitably secured in place within each of the headers 15, the block 17 at the lower end of the back wall, and the block 18 at the front end of the bottom wall, and tapped holes 19 and 20 are provided in said blocks for the connection of the pipe 10 with one header and the pipe 11 with the other, either from behind or beneath the headers. That is, when the pipes are connected with the headers in the holes 19, the holes 20 are plugged, and vice versa. As explained above, in some installations it is necessary to extend the pipes along the floor from the back of the heater before extending them down through the floor, in order to avoid cross members of the frame; in such cases the holes 19 are used. Otherwise, the holes 20 may be used.

A sheet metal shell or casing 21 is provided, extending the full length of the heater from header to header, as indicated in Fig. 2, and, as shown in Figs. 3 and 4, is conformed approximately to the triangular cross-section of the headers to fit across the bottom and back thereof, as indicated at 22 and 23, respectively, and partly up the front, as at 24, and partly across the top, as at 25. Longitudinal flanges 26 and 27 are provided on the front and top portions of the casing extending substantially parallel to one another. End pieces 28 for the casing are provided, as indicated in Fig. 2, and flanged to fit over the ends of the casing and be held in place by a front cover plate 29, the rim of which is flanged, as appears at 30, to fit over the flanges 26 and 27 of the casing 21, as well as over the end pieces 28 so as to complete the casing assembly and completely enclose the radiator therein. Screws 31, passed through holes in the ends of the cover 29, thread in nuts 32 provided on the fronts of the headers 15 to keep the parts in assembled relation. A hole 33 is also provided at one end of the cover close to the top thereof through which access may be had to a plug removably threaded in a hole in the front wall of the one header near the top thereof. The removal of this plug permits the escape of air from the radiator when the system is being filled, and, of course, the plug is inserted as soon as all of the air has escaped. Openings 35 are provided in the cover 29 entirely across the front of the core 13 of the radiator, so that the cover constitutes a grating through which the heated air is arranged to be discharged and on which passengers may rest their feet without danger of damaging the radiator. The air to be heated is supplied through a tube or thimble 36 slipped through a hole 37 provided in the bottom 22 of the casing 21. Several of these holes may be provided in the bottom of the casing, and whichever one is most conveniently situated, considering the location of brake rods and the like in a given installation, can be used and a hole cut through the floor to register therewith and permit the extension therethrough of the tube for connection with the fan.

A centrifugal fan is shown at 38 suitably suspended from beneath the floor at a point between the heater and a cold air register 39 provided on the floor, preferably, but not necessarily, at a point in front of the front seat. The fan 38 may be of the type disclosed in my application, Serial No. 456,960 filed May 29, 1930, having an electric motor 45 suitably supported on the casing of the fan, as indicated by the dotted circle in Figure 1, and driving a squirrel-cage type impeller within the casing. As disclosed in said application, the casing of the fan has the intake through the side of the casing substantially centrally of the impeller; a tube 40 is shown having communication with the cold air register 39 for delivery of cold air to the fan at the point mentioned. The air is discharged from the casing of the fan substantially tangentially with reference to the impeller, as at 41, and a tube 42 conducts the air to the heater by way of the tube 36, to which the tube 42 is suitably attached.

The provision of the fan as a separate unit for creating the forced draft through the heater and the mounting thereof out of the way under the floor is, of course, the feature mainly responsible for the compactness arrived at in the construction of the heater; the heater is reduced in size practically to the dimensions of the radiator employed. But aside from the advantage of compactness, it is noteworthy that circulation of air in the tonneau is promoted by placing the cold air register 39 in the front passenger compartment and the heater in the rear passenger compartment, with the fan therebetween to draw in cold air through the register 39 for discharge through the heater, and, of course, the improved circulation means more uniform heat distribution, which is something not very easily obtained, particularly with certain types of heaters. The disposition of the radiator inclined from the vertical is also of advantage from the standpoint of promoting good circulation and heat distribution, because the heated air is directed upwardly as one part of a natural circuit, as indicated by the arrows in Figure 1. Where the heater is installed behind the front seat, as shown in full lines in Figure 1, the rear seat passengers are given the full benefit of the heat by reason of the fact that the air is thrown rearwardly and upwardly, as indicated. It is also apparent that when the heater is mounted in that location in a five passenger car the cover thereof is close enough to the rear seat to serve as a foot rest, and the inclination thereof is just right for good comfort.

It is believed the foregoing description conveys a clear understanding of all of the objects and advantages of my invention. Certain changes might be made without seriously departing from the spirit and scope of the invention, and for that reason, the appended claim has been drawn with a view to covering all legitimate modifications and adaptations.

I claim:

A heater for heating the interior of an automobile or the like comprising an air circulating system having an inlet end connected with the interior of the car in front of the front seat and having an air discharge connected with the interior of the car behind the front seat, a heat radiator disposed inside the car behind the front seat over the air discharge whereby to distribute heat by forced circulation from the radiator inside the car behind the front seat, and a centrifugal fan on the outside of the car in said air circulating system between the inlet and discharge ends, said fan comprising a housing having the inlet end of said system communicating with the center of one side and having the discharge end of said system communicating with the peripheral portion of the housing substantially on a tangent, there being an electric motor disposed adjacent said fan housing preferably in a unitary assembly therewith and serving to drive the rotor in said housing.

ALBERT H. BATES.